US008906147B2

(12) United States Patent
Noda et al.

(10) Patent No.: US 8,906,147 B2
(45) Date of Patent: Dec. 9, 2014

(54) DEGASSING APPARATUS (75) Inventors: Kazuo Noda, Tokyo (JP); Shigehisa Ueda, Tokyo (JP)

(73) Assignee: Sumitomo Bakelite Company Limited, Tokyo (JP)

( * ) Notice: Subject to any disclaimer, the term of this patent is extended or adjusted under 35 U.S.C. 154(b) by 209 days.

(21) Appl. No.: 13/574,841

(22) PCT Filed: Feb. 1, 2011

(86) PCT No.: PCT/JP2011/052039

§ 371 (c)(1),
(2), (4) Date: Jul. 24, 2012

(87) PCT Pub. No.: WO2011/096396

PCT Pub. Date: Aug. 11, 2011

(65) Prior Publication Data

US 2012/0291631 A1 Nov. 22, 2012

(30) Foreign Application Priority Data

Feb. 5, 2010 (JP) ................................ 2010-023944

(51) Int. Cl.
| | |
|---|---|
| B01D 19/00 | (2006.01) |
| B29B 7/84 | (2006.01) |
| B29C 47/76 | (2006.01) |
| B29C 47/60 | (2006.01) |
| B29C 47/38 | (2006.01) |
| B29C 47/00 | (2006.01) |

(52) U.S. Cl.
CPC ............ *B29B 7/847* (2013.01); *B01D 19/0036* (2013.01); *B29C 47/765* (2013.01); *B29C 47/6056* (2013.01); *B29C 47/38* (2013.01); *B29C 47/0009* (2013.01)
USPC .............................................. 96/194; 95/266

(58) Field of Classification Search
CPC .. B01D 19/0036; B29B 7/847; B29C 47/009; B29C 47/38; B29C 47/6056; B29C 47/765
USPC ...................................... 95/266; 96/193–200
See application file for complete search history.

(56) References Cited

U.S. PATENT DOCUMENTS

| | | | | | |
|---|---|---|---|---|---|
| 1,614,526 | A | * | 1/1927 | Lambie et al. | ................. 264/102 |
| 2,306,265 | A | * | 12/1942 | Franklin | .......................... 95/254 |

(Continued)

FOREIGN PATENT DOCUMENTS

| | | |
|---|---|---|
| CN | 1050564 C | 3/2000 |
| GB | 2270029 A * | 3/1994 |

(Continued)

OTHER PUBLICATIONS

International Search Report issued in PCT/JP2011/052039 dated Mar. 8, 2011.

(Continued)

*Primary Examiner* — Duane Smith
*Assistant Examiner* — Cabrena Holecek
(74) *Attorney, Agent, or Firm* — Birch, Stewart, Kolasch & Birch, LLP (57) ABSTRACT

A degassing apparatus 1 includes a housing 2 having a degassing chamber 22, a rotor 3 rotatably provided in the housing 2 and a decompressing mechanism 4 for decompressing the degassing chamber 22 of the housing 2. The housing 2 further includes a conduit line 21 and a cylindrical portion 23. The degassing chamber 22 is provided in a middle part of the conduit line 21. An upper end of the conduit line 21 constitutes an inlet port 24 and a lower end of the conduit line 21 constitutes an outlet port 25. The rotor 3 is rotatably provided inside the cylindrical portion 23 so that a passage between the outlet portion 25 and the degassing chamber 22 can be hermetically separated by the rotor 3. The rotor 3 has four partitioning plates 31 which partition the inside of the cylindrical portion into four spaces 231-234.

13 Claims, 9 Drawing Sheets

(56) References Cited

U.S. PATENT DOCUMENTS

| | | | | | |
|---|---|---|---|---|---|
| 2,774,105 | A | * | 12/1956 | Bernhardt | 96/196 |
| 3,031,030 | A | * | 4/1962 | Wolf | 96/196 |
| 3,371,379 | A | * | 3/1968 | Reifenhauser | 96/196 |
| 5,494,425 | A | * | 2/1996 | Stehr | 418/83 |
| 2009/0221788 | A1 | | 9/2009 | Damme | |

FOREIGN PATENT DOCUMENTS

| | | | |
|---|---|---|---|
| JP | 63-69604 | A | 3/1988 |
| JP | 6-190891 | A | 7/1994 |
| JP | 6-226816 | A | 8/1994 |
| JP | 8-15732 | B2 | 2/1996 |
| JP | 8-332616 | A | 12/1996 |
| JP | 9-290421 | A | 11/1997 |
| JP | 10-180839 | * | 7/1998 |
| JP | 10-180839 | A | 7/1998 |
| JP | 2001-81284 | A | 3/2001 |
| JP | 2006-123449 | A | 5/2006 |
| JP | 2007-31768 | A | 2/2007 |
| JP | 2007-190905 | A | 8/2007 |
| JP | 2009-528930 | A | 8/2009 |

OTHER PUBLICATIONS

Office Action issued Mar. 4, 2014, in Chinese Patent Application No. 102280006221.4.

Notice of Refusal issued Jan. 14, 2014, in Japanese Patent Application No. 2010-023944, with English translation.

Notice of Refusal issued Sep. 9, 2014, in Japanese Patent Application No. 2010-023944, with English translation.

* cited by examiner

DEGASSING APPARATUS

The present invention relates to a degassing apparatus.

BACKGROUND OF THE INVENTION

There is known a semiconductor package in which a semiconductor chip (semiconductor element) is covered (encapsulated) with a resin-made encapsulating material. The encapsulating material for the semiconductor chip is produced by molding a resin composition through, e.g., a transfer molding method. In such a method, in the case where the resin composition is not sufficiently degassed, there is a problem in that voids are formed in the encapsulating material.

As one method for preventing formation of the voids in the encapsulating material, patent document 1 discloses a method for degassing the resin composition. In the method, a bent port (degassing chamber) for decompression is provided in the middle of a double-axis type kneading extruder so as to be communicated with an inside thereof. By decompressing the inside of the bent port, the resin material is degassed.

However, according to the one method of the patent document 1, if a pressure in the bent port is too low, a material contained in the double-axis type kneading extruder is sucked toward the bent port. For this reason, the pressure in the bent port cannot be sufficiently lowered. This makes it impossible to sufficiently degas the material. As a result, when the semiconductor chip is sealed with the produced resin composition, there is a possibility that the voids are formed in, the produced resin composition.

Further, another method in that the degassing chamber is provided between two double-axis type kneading extruders is also proposed. In this method, an inlet port of the degassing chamber is connected to a discharge passage of a first kneading apparatus, and an outlet port of the degassing chamber is connected to a charge passage of a second kneading apparatus. A material kneaded in the first kneading apparatus is degassed in the degassing chamber and then is kneaded in the second kneading apparatus. In this regard, a decompression of the degassing chamber is enabled by sealing a side of the inlet port of the degassing chamber with the material contained in the first kneading apparatus and a side of the outlet port of the degassing chamber with the material contained in the second kneading apparatus.

However, according to another method, when the degassing chamber is decompressed, the material contained in the second kneading apparatus is sucked toward an opposite direction with respect to a direction to which the material contained in the second kneaded apparatus is to be transferred, which results in poor stability.

Patent Document 1: JP-A 2001-81284.

It is an object of the present invention to provide a degassing apparatus which can easily and reliably degas a kneaded material.

In order to achieve the object, one aspect of the present invention is directed to a degassing apparatus comprising: a housing having an inlet port from which a material that has been kneaded is introduced, a degassing chamber in which the kneaded material is degassed and an outlet port from which the kneaded material that has been degassed, is discharged; a decompression device that decompresses the degassing chamber; and a separating device that hermetically separates the outlet port from the degassing chamber, wherein in a state that the outlet port is hermetically separated from the degassing chamber by the separating device, and then the degassing chamber is decompressed by the decompression device, the material introduced into the degassing chamber is degassed.

In the degassing apparatus of the present invention, it is preferred that the housing further has a cylindrical portion which is formed into cylindrical shape and provided between the inlet port and the outlet port, the separating device is rotatably provided in the cylindrical portion and has a rotor having plural partitioning plates which partition an inside of the cylindrical portion into plural spaces, and the material is delivered to the outlet port with the partitioning plates by rotation of the rotor.

In the degassing apparatus of the present invention, it is preferred that the degassing chamber is provided between the inlet port and the cylindrical portion.

In the degassing apparatus of the present invention, it is preferred that the decompression device has a conduit line which communicates with the degassing chamber and the degassing chamber has the plural spaces of the cylindrical portion, and each of the plural spaces is allowed to be rotated by the rotation of the rotor, and one space of the plural spaces, which communicates with the conduit line, is decompressed through the conduit line.

In the degassing apparatus of the present invention, it is preferred that the degassing apparatus has a non-communicating state in which the one space does not communicate with the inlet port and the outlet port, and the material in the degassing chamber is degassed in the non-communicating state.

In the degassing apparatus of the present invention, it is preferred that a gap is formed between an inner peripheral surface of the cylindrical portion and a distal end portion of the partition plate and a width of the gap is set to be equal to or less than 0.2 mm.

In the degassing apparatus of the present invention, it is preferred that at least a surface of the rotor is constituted of a nonmetallic material.

In the degassing apparatus of the present invention, it is preferred that at least an inner peripheral surface of the cylindrical portion is constituted of a nonmetallic material.

In the degassing apparatus of the present invention, it is preferred that a retention time of the material in the degassing apparatus is equal to or less than 1 minute.

In the degassing apparatus of the present invention, it is preferred that when the degassing chamber is decompressed by the decompressing device, the pressure in the degassing chamber is set to be equal to or less than 60 kPa.

In the degassing apparatus of the present invention, it is preferred that the inlet port is connected to a discharge passage of a kneading device in which the material is kneaded.

DETAILED DESCRIPTION OF THE PREFERRED EMBODIMENT

Hereinbelow, a degassing apparatus according to the present invention will be described in detail based on the preferred embodiments shown in the accompanying drawings.

First Embodiment

Figure 1:
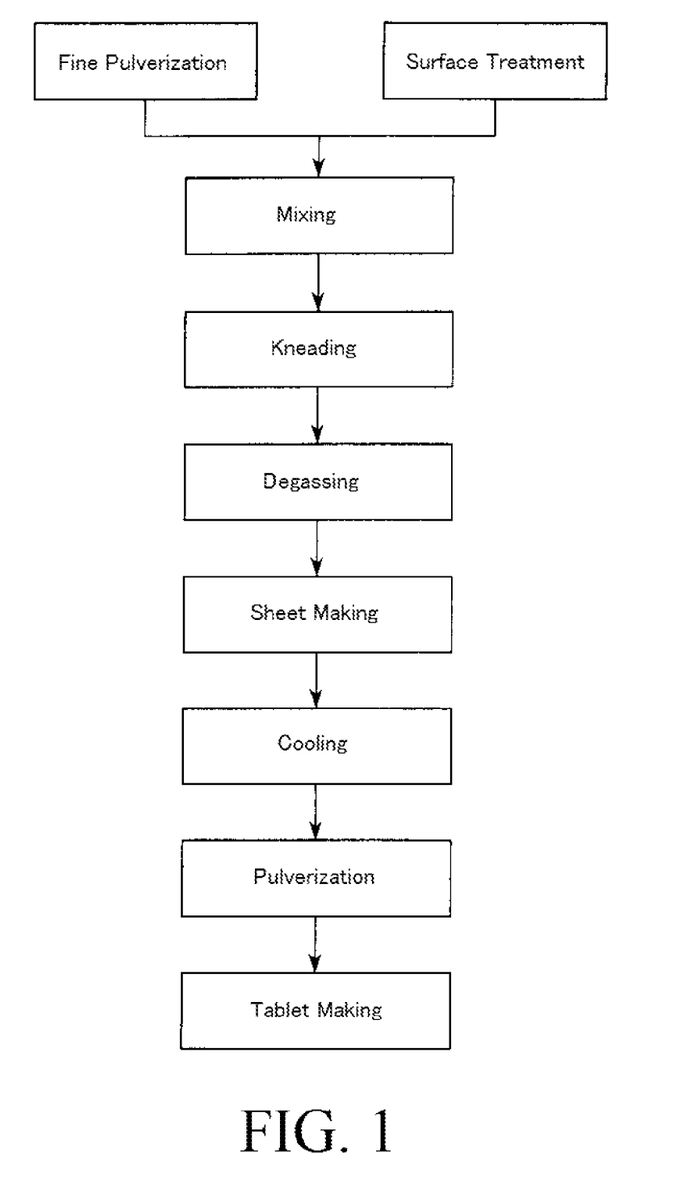
FIG. 1 is a view showing a producing process of a resin composition.
Figure 2:
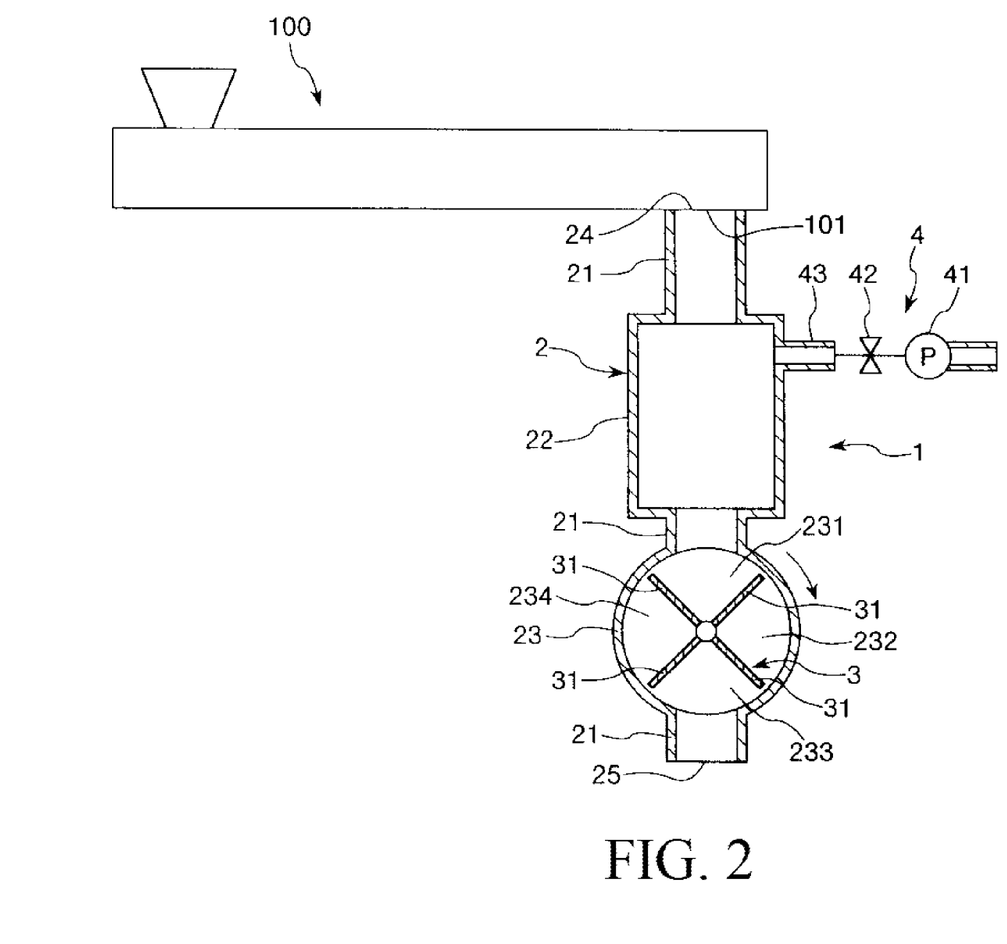
FIG. 2 is a cross section view showing a degassing apparatus according to a first embodiment of the present invention.

FIG. 1 is a view showing a producing process of a resin composition. FIG. 2 is a cross section view showing a degassing apparatus according to a first embodiment of the present invention.

In the following description, the upper side in FIG. 2 will be referred to as "upper (upstream)", the lower side will be referred to as "lower (downstream)", the left side will be referred to as "left", and the right side will be referred to as "right".

A degassing apparatus 1 shown in FIG. 2 is an apparatus used in a degassing process to produce a resin composition as a molded body (compact). Prior to describing the degassing apparatus 1, description will be first given to the overall producing process which begins with the supply of raw materials and ends with the production of the resin composition.

At first, individual materials as raw materials of the resin composition are prepared. The raw materials include a resin, a curing agent and a filler material (fine particle). If necessary, the raw materials may further include a curing accelerator and a coupling agent. It is preferable to use an epoxy resin as the resin.

Examples of the epoxy resin include a cresol novolac type resin, a biphenyl type epoxy resin, a dicyclopentadiene type epoxy resin, a triphenol methane type epoxy resin and a multi-ring aromatic type epoxy resin.

Examples of the curing agent include a phenol novolac type resin, a phenol aralkyl type resin, a triphenol methane type resin and a multi-ring aromatic resin.

Examples of the filler material include a fused silica (having a crushed shape or a spherical shape), a crystalline silica and an alumina.

Examples of the curing accelerator include a phosphor compound and an amine compound. Examples of the coupling agent include a silane compound and so forth.

Specific one of the materials stated above may be excluded from the raw materials. Other materials than set forth above may be further included in the raw materials. Examples of the other materials include a coloring agent, a releasing agent, a flame retardant and a stress-reducing agent.

Examples of the flame retardant include a brominated epoxy resin, an antimony oxide based flame retardant, non-halo and non-antimony based flame retardant. Examples of the non-halo and non-antimony based flame retardant include organic phosphor, metal hydrate and a nitrogen-containing resin.

(Fine Pulverization)

As shown in FIG. 1, specific materials among the raw materials are first pulverized (finely pulverized) by a first pulverizing apparatus to have a specified particle size distribution. Examples of the raw materials to be pulverized include the resin, the curing agent, the curing accelerator and other materials except the filler materials. A part of the filler materials may be added into the raw materials to be pulverized. As the first pulverizing apparatus, it is possible to use a continuous rotary ball mill and so forth.

(Surface Treatment)

A specified material among the raw materials, for example, all or a part (remaining part) of the filler materials, is subjected to a surface treatment. In the surface treatment, for example, the coupling agent adheres to a surface of the filler material. The fine pulverization and the surface treatment may be performed either simultaneously or one after the other.

(Mixing)

Next, a composition containing the above raw materials is thoroughly mixed by a mixing device. As the mixing device, it is possible to use, for example, a high-speed mixing device having a rotating blade.

(Kneading)

Next, the mixed composition is kneaded by a kneading apparatus 100. As the kneading apparatus 100, it is possible to use, for example, a kneading extruder such as a single-axis type kneading extruder or a double-axis type kneading extruder, or a roll type kneader such as a mixing roll and so forth.

(Degassing)

Next, the mixed composition thus kneaded (kneaded material) is degassed by a degassing apparatus 1. The degassing apparatus 1 will be described later.

(Sheet Making)

Next, the massive kneaded composition thus degassed is molded into a sheet shape by a sheet-making device. As a result, a sheet shaped material is obtained. As the sheet-making device, it is possible to use, e.g., a sheet-making roll.

(Cooling)

Next, the sheet shaped material is cooled by a cooling device. This makes it possible to easily and reliably perform pulverization of the sheet shaped material.

(Pulverization)

Next, the sheet shaped material is pulverized by a second pulverizing apparatus to have a specified particle size distribution. As a result, pulverized compositions are obtained. As the second pulverizing apparatus, it is possible to use, e.g., a hammer mill.

In this regard, The granular or powdery resin composition may be obtained not by the sheet-making, cooling and pulverizing steps. Instead, the granular or powdery resin composition may be obtained by, e.g., a hot cutting method in which a die having a small diameter is installed in an outlet port (discharge passage) of the kneading apparatus and a molten resin composition discharged from the die is cut by a cutter into granular resin composition having a specified length. After obtaining the granular resin composition by the hot cutting method, it is preferable to perform degassing while the temperature of the resin composition remains high.

(Tablet Making)

Next, the pulverized compositions are compression-molded by a compact manufacturing device (tablet-making device) to obtain resin composition in the form of compacts.

The resin composition are used in, e.g., covering (encapsulating) a semiconductor chip (semiconductor element). In other words, the resin composition is molded by, e.g., a transfer molding method. A semiconductor chip is covered with the molded resin composition as an encapsulating material, thus manufacturing a semiconductor package.

The tablet-making step may be omitted and the powdery resin compositions may be used as final products. In this case, encapsulating materials can be formed by, e.g., a compression-molding or an injection-molding method.

Next, description will be given to the degassing apparatus 1. As shown in FIG. 2, the degassing apparatus 1 is used to be connected to a discharge passage 101 of the kneading apparatus 100.

The degassing apparatus 100 has a housing 2, a rotor (separating device) 3 rotatably provided in the housing 2 and a decompression mechanism (decompression device) 4 for decompressing a degassing chamber 22 of the housing 2.

The housing 2 has a conduit line 21, the degassing chamber 22 provided in the middle of the conduit line 21 and a cylindrical portion 23 having a cylindrical (tubular) shape. In the degassing chamber 22, the degassing apparatus 1 degasses the kneaded composition. The cylindrical portion 23 is provided at the lower side of the degassing chamber 22. Further, an upper end of the conduit line 21 constitutes an inlet port 24 from which the composition kneaded by the kneading apparatus 100 is introduced and a lower end of the conduit line 21 constitutes an outlet port 25 from which the kneaded composition thus degassed is discharged.

The degassing chamber 22 is provided between the inlet port 24 and the cylindrical portion 23. In the configuration shown in the drawings, the degassing chamber 22 has a tubular shape which is a rectangular in vertical cross section. A horizontal cross sectional area of an inside of the degassing chamber 22 is set to be greater than a horizontal cross sectional area of an inside of the conduit line 21. The horizontal cross sectional area of the inside of the degassing chamber 22 may be set to be equal to the horizontal cross sectional area of the inside of the conduit line 21.

The cylindrical portion 23 is provided between the degassing chamber 22 (the inlet port 24) and the outlet port 25. In the configuration shown in the drawings, the cylindrical portion 23 has the cylindrical shape having sealed end portions. The rotor 3 is provided in the cylindrical portion 23 in a state that the rotor 3 is capable of rotating in a clockwise direction. The rotor 3 can hermetically separate the degassing chamber 22 from the outlet port 25. This makes it possible to easily and reliably decompress the degassing chamber 22. In this regard, an upper side of the housing 2 is hermetically sealed with the kneaded composition stored in the kneading apparatus 100.

The rotor 3 has plural (in the configuration shown in the drawings, four) partitioning plates 31 for partitioning an inside of the cylindrical portion 23 into plural spaces (in the configuration shown in the drawings, spaces 231, 232, 233 and 234). In the configuration shown in the drawings, each of the partitioning plates 31 is arranged at equal (angle) intervals (in the configuration shown in the drawings, 90 degree intervals). The rotor 3 rotates by driving of a motor (driving force) not shown in the drawings. Due to the rotation of the rotor 3, the kneaded composition is delivered to the outlet port 25 by the partitioning plates 31.

In the degassing apparatus 1, a gap is formed between an inner peripheral surface of the cylindrical portion 23 and a distal end portion of the partitioning plate 31. This makes it possible to prevent the partitioning plate 31 from scratching the inner peripheral surface of the cylindrical portion 23 while the rotor 3 rotates. As a result, it is possible to prevent pulverized materials constituted of the same material as the partitioning plate 31 or the cylindrical portion 23 from being mixed into the resin composition finally obtained.

A distal end of the partitioning plate 31 may be formed into round shape by round chamfering. In this case, a curvature radius (R) of the distal end of the partitioning plate 31 is preferably in the range of 0.2 to 2 mm, and more preferably in the range of 0.2 to 1 mm. If the curvature radius (R) is too high, it is not preferable in the course of work because the kneaded material is adhered to the distal end portion of the partitioning plate 31 and the inner peripheral surface of the cylindrical portion 23.

A width of the gap, that is, a distance from the inner peripheral surface of the cylindrical portion 23 and a distal end portion of the partitioning plate 31 is preferably equal to or less than 0.2 mm, and more preferably in the range of about 0.01 to 0.1 mm. This makes it possible to prevent the partitioning plate 31 from scratching the cylindrical portion 23 while maintaining a pressure in the degassing chamber 22.

Further, the partitioning plate 31 and the cylindrical portion 23 may be cooled. This makes it possible to prevent the kneaded composition from adhering to the partitioning plate 31 and the cylindrical portion 23 and smoothly perform the degassing process.

A constituent material of the housing 2 is not particularly limited to a specific material, but at least the inner peripheral surface of the cylindrical portion 23 is preferably constituted of a nonmetallic material. In this case, whole of the cylindrical portion 23 may be constituted of the nonmetallic material. Further, whole of the housing 2 may be constituted of the nonmetallic material.

A constituent material of the rotor 3 is not particularly limited to a specific material, but at least a surface of the rotor 3 is preferably constituted of a nonmetallic material. In this case, whole of the rotor 3 may be constituted of the nonmetallic material.

This makes it possible to prevent metallic foreign substances from being mixed into the kneaded composition when the kneaded composition is degassed. As a result, it is possible to prevent a short circuit and so forth when the semiconductor chip is sealed with a produced resin composition. Specifically, an increased metal content contained in the kneaded composition thus degassed by the degassing apparatus 1 can be lowered equal to or less than 1.0 wt ppm, especially equal to or less than 0.1 wt ppm.

The nonmetallic material is not particularly limited to a specific material. Examples of such nonmetallic material include, for example, a ceramic material such as an alumina, a zirconia and so forth, and a resin material. Among the above nonmetallic material, it is preferable to use the ceramic material.

The decompression mechanism 4 has a conduit line 43 connected to the degassing chamber 22 (in communicating with the inside of the degassing chamber 22), a pump 41 for decompressing the degassing chamber 22 through the conduit line 43 and a valve 42 provided between the degassing chamber 22 and the pump 41.

At a time when the kneaded composition is degassed, the valve 42 is opened and the pump 41 is driven, thereby the degassing chamber 22 is decompressed.

When the degassing chamber 22 is decompressed, a degree of the decompression (degree of vacuum), that is, the pressure (atmosphere pressure) in the degassing chamber 22 is not particularly limited to a specific value, but is preferably set to be equal to or less than 60 kPa, is more preferably set to be equal to or less than 50 kPa, and is even more preferably set to be in the range of about 30 to 50 kPa. This makes it possible to more reliably degas the kneaded composition.

Next, description will be given to an function of the degassing apparatus 1 in the degassing process with reference to FIG. 2. As described above, the degassing chamber 22 is hermetically separated from the outlet port 25 by the partitioning plates 31 of the rotor 3 provided in the cylindrical portion 23. (In other words, the housing 2 of the degassing apparatus 1 is in a sealed state in that the partitioning palates 31 hermetically separate between the degassing chamber 22 and the outlet port 25.)

At the time when the composition kneaded by the kneading apparatus 100 (kneaded composition) is degassed, the valve 42 of the degassing apparatus 1 is opened and the pump 41 is driven, thereby the degassing chamber 22 is decompressed. Further, the rotor 3 is simultaneously rotated by the driving of the motor (not shown in the drawings). When the degassing chamber 22 is decompressed, an upper side of the conduit line 21 is changed into a decompression state by a decompression as well as the degassing chamber 22. Similarly, the lower side of the conduit line 21 and the space 231 partitioned with the partitioning plates 31 provided in the cylindrical portion 23 in communicating with the conduit line 21 are changed into the decompression state by the decompression.

The kneaded composition is discharged from the discharge passage 101 of the kneading apparatus 100 and introduced (applied) into the outlet port 24 of the degassing apparatus 1. And then, the kneaded composition is delivered to the lower side of the degassing apparatus 1 through the conduit line 21 and the degassing chamber 22 by its own weight (gravity). Next, the kneaded composition is stored in the space 231 formed in the cylindrical portion 23 in communicating with the conduit line 21. Next, the kneaded composition is degassed while the space 231 is in communicating with the conduit line 21. This makes it possible to remove gas, such as air or the like, and water from the kneaded composition. As a result, it is possible to prevent voids from occurring when the semiconductor chip is sealed with the produced resin composition, thereby it is possible to improve reliability of the semiconductor package.

Due to the rotation of the rotor 3, the kneaded composition stored in the space 231 is delivered to the outlet port 25 by the partitioning plates 31 and then discharged from the outlet port 25.

In this regard, a retention time of the kneaded composition in the degassing apparatus 1 is preferably equal to or less than 1 minute, more preferably in the range of 3 to 30 seconds, and even more preferably 5 to 15 seconds.

By setting the retention time to fall below the upper limited value noted above, it is possible to prevent the properties of the kneaded composition from deteriorating by heat history thereof. Further, this makes it possible to suppress cooling of the kneaded composition during the degassing process, thereby not interfering the sheet making of the kneaded composition in the next process. Further, by setting the retention time to exceed the lower limited value noted above, it is possible to reliably degas the kneaded composition.

In this regard, the retention time means a time which is taken from the applying of the kneaded material into the outlet port 24 of the degassing apparatus 1 to the discharging of the kneaded composition from the outlet port 25 thereof.

The retention time can be freely adjusted by controlling the driving of the rotor 3. For example, by setting a rotation speed (number of rotation) of the rotor 3 to a specified value, the retention time can be set to a target time. Further, by stopping the rotation of the rotor 3 for a predetermined time in the course of the degassing process, the retention time can be also set to the target time. Specifically, examples of the method for adjusting the retention time include a first method and a second method described in the following.

(First Method)

The rotor 3 is set to continuously rotate and the rotation speed of the rotor 3 is set to the specified value. In this case, the rotation speed is preferably set in the range of about 1 to 10 rpm, and more preferably in the range of about 2 to 6 rpm.

(Second Method)

The rotor 3 is set to intermittently rotate by a predetermined angle and a stopping time of the rotation of the rotor 3 per one operation of the rotation is set to the predetermined time. In this case, the stopping time of the rotation of the rotor 3 is appropriately set depending on conditions including the rotation speed of the rotor 3, a rotation angle per the one operation of the rotation of the rotor 3, a number of the partitioning plates 31 of the rotor 3 and so forth, but is preferably set in the range of about 1 to 60 seconds, and is more preferably set in the range of about 1 to 15 seconds.

Further, the rotation speed of the rotor 3 is appropriately set depending on conditions including stopping time of the rotation of the rotor 3, the rotation angle per the one operation of the rotation of the rotor 3, the number of the partitioning plates 31 of the rotor 3 and so forth, but is preferably set in the range of about 1 to 13 rpm, and is more preferably set in the range of about 2 to 8 rpm.

Further, the rotation angle per the one operation of the rotation of the rotor 3 is appropriately set depending on conditions including the number of the partitioning plates 31 of the rotor 3 and so forth. For example, the rotation angle is preferably set in the range of about 45 to 120°, and is more preferably set in the range of about 90 to 120°. For example, in the case where the number of the partitioning plates 31 is "N", the rotation angle per the one operation of the rotation of the rotor 3 is set to 360/N (°). In this case, in the configuration shown in the drawings, since the number of the partitioning plates 31 is four, the rotation angle per the one operation of the rotation of the rotor 3 is set to 90°.

As set forth above, according to the degassing apparatus 1, the kneaded composition can be reliably degassed. This makes it possible to prevent the voids from forming when the semiconductor chip is sealed with the produced resin composition, thereby it is possible to improve reliability of the semiconductor package.

Further, when the kneaded composition is degassed, it is possible to prevent adverse effect from being given on the process of the kneading apparatus 100.

Second Embodiment

Figure 3:
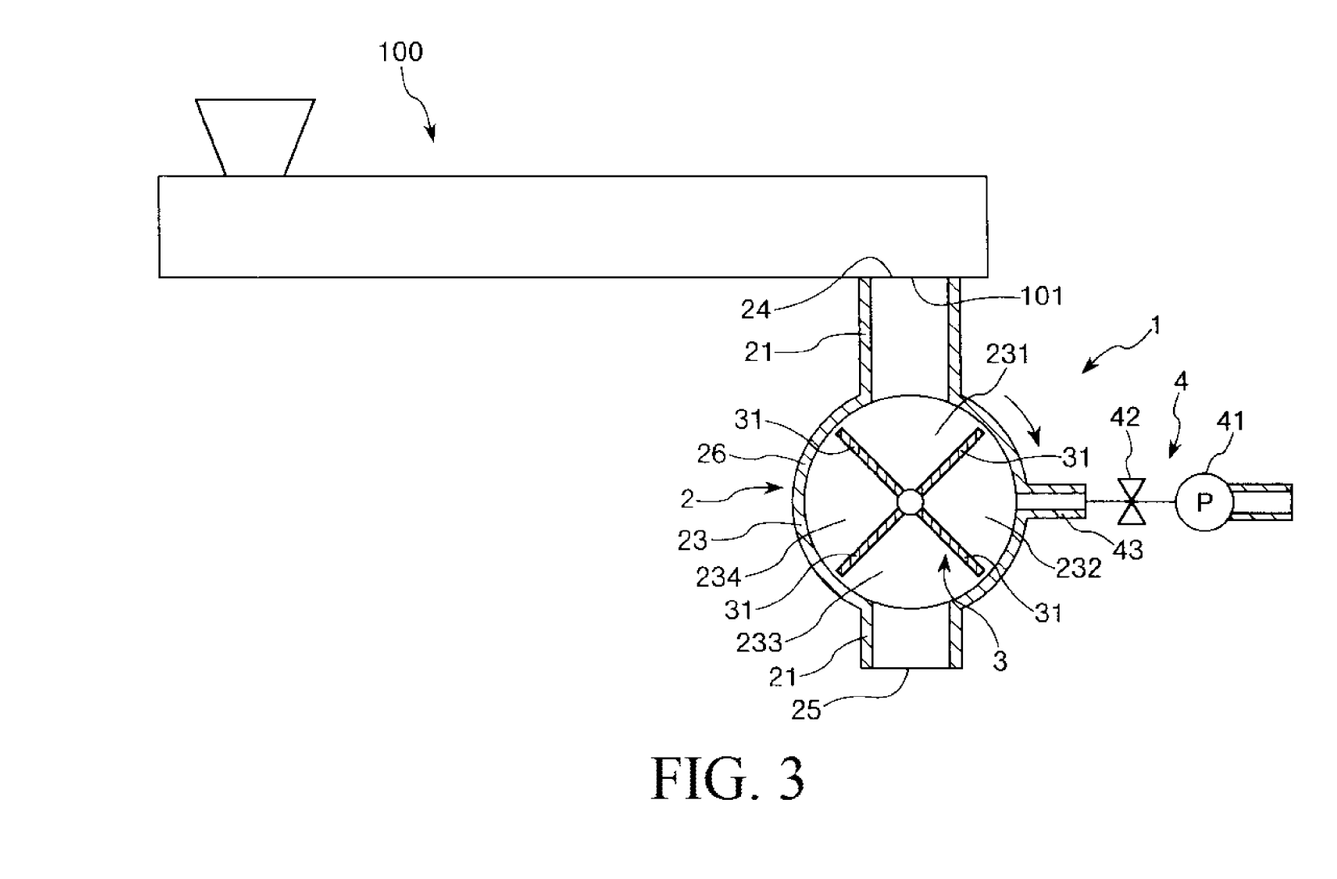
FIG. 3 is a cross section view showing a degassing apparatus according to a second embodiment of the present invention.
Figure 4:
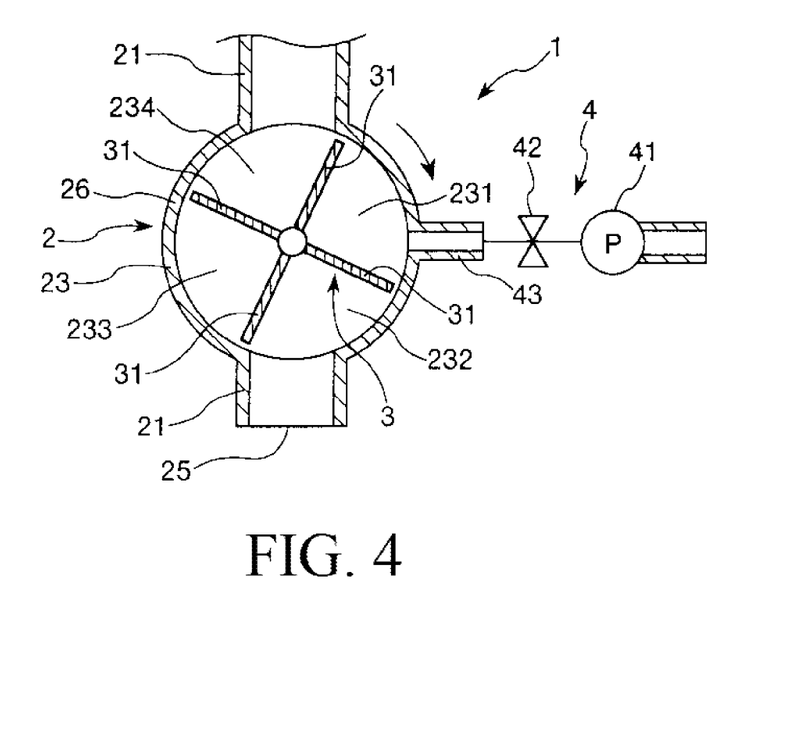
FIG. 4 is a cross section view showing the degassing apparatus shown in FIG. 3.
Figure 5:
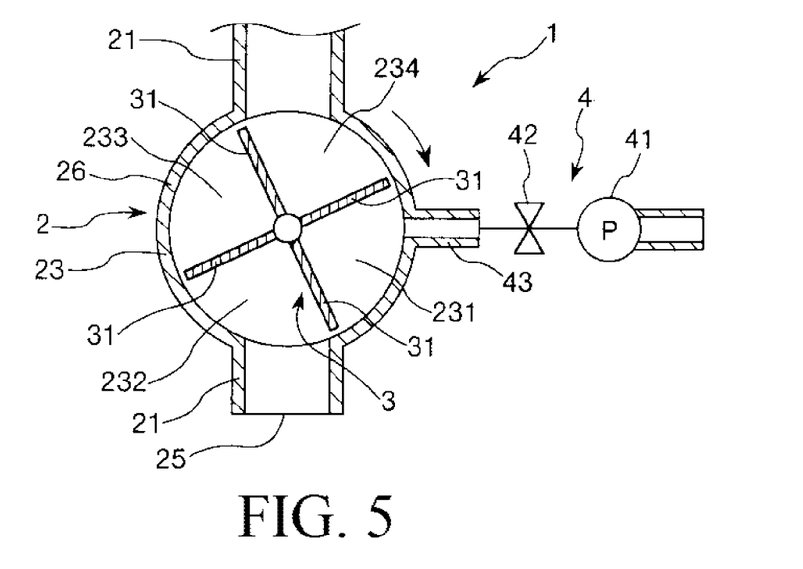
FIG. 5 is a cross section view showing the degassing apparatus shown in FIG. 3.

FIG. 3 is a cross section view showing a degassing apparatus according to a second embodiment of the present invention. Each of FIGS. 4 and 5 is a cross section view showing the degassing apparatus shown in FIG. 3. In the following description, the upper side in FIGS. 3-5 will be referred to as "upper (upstream)", the lower side will be referred to as "lower (downstream)", the left side will be referred to as "left", and the right side will be referred to as "right".

Hereinbelow, the second embodiment of the degassing apparatus will be described by placing emphasis on the points differing from the first embodiment of the degassing apparatus, with the same matters omitted from description.

As shown in FIG. 3, in the degassing apparatus 1 of the second embodiment, a degassing chamber 26 has the cylindrical portion 23 and the rotor 3. In other words, each of the four spaces 231-234 formed in the cylindrical portion 23 constitutes a space of the degassing chamber 26.

Further, the conduit line 43 of the decompression mechanism 4 is connected to the cylindrical portion 23, namely a right side of the degassing chamber 26 (in communicating with the inside of the degassing chamber 26).

Due to the rotation of the rotor 3, each of the four spaces 231-234 formed in the cylindrical portion 23 is rotated. The space of the four spaces 231-234 in communicating with the conduit line 43 (in the configuration shown in FIG. 3, space 232), is configured to be decompressed through the conduit line 43 to thereby be changed into the decompression state.

As shown in FIG. 3, in this degassing apparatus 1, the kneaded composition introduced from the inlet port 24 of the degassing apparatus 1 is delivered to the lower side of the degassing apparatus 1 through the conduit line 21 by its own weight. Next, the kneaded composition is stored in the space 231 formed in the cylindrical portion 23 in communicating with the conduit line 21.

From a state shown in FIG. 4 to a state shown in FIG. 5, the degassing apparatus has a non-communicating state in which the space 231 does not communicate with the inlet port 24 and the outlet port 25. During the non-communicating state, the kneaded composition stored in the space 231 is degassed. According to the degassing apparatus 1 of the second embodiment, the same effect as the first embodiment described above can be obtained.

Third Embodiment

Figure 6:
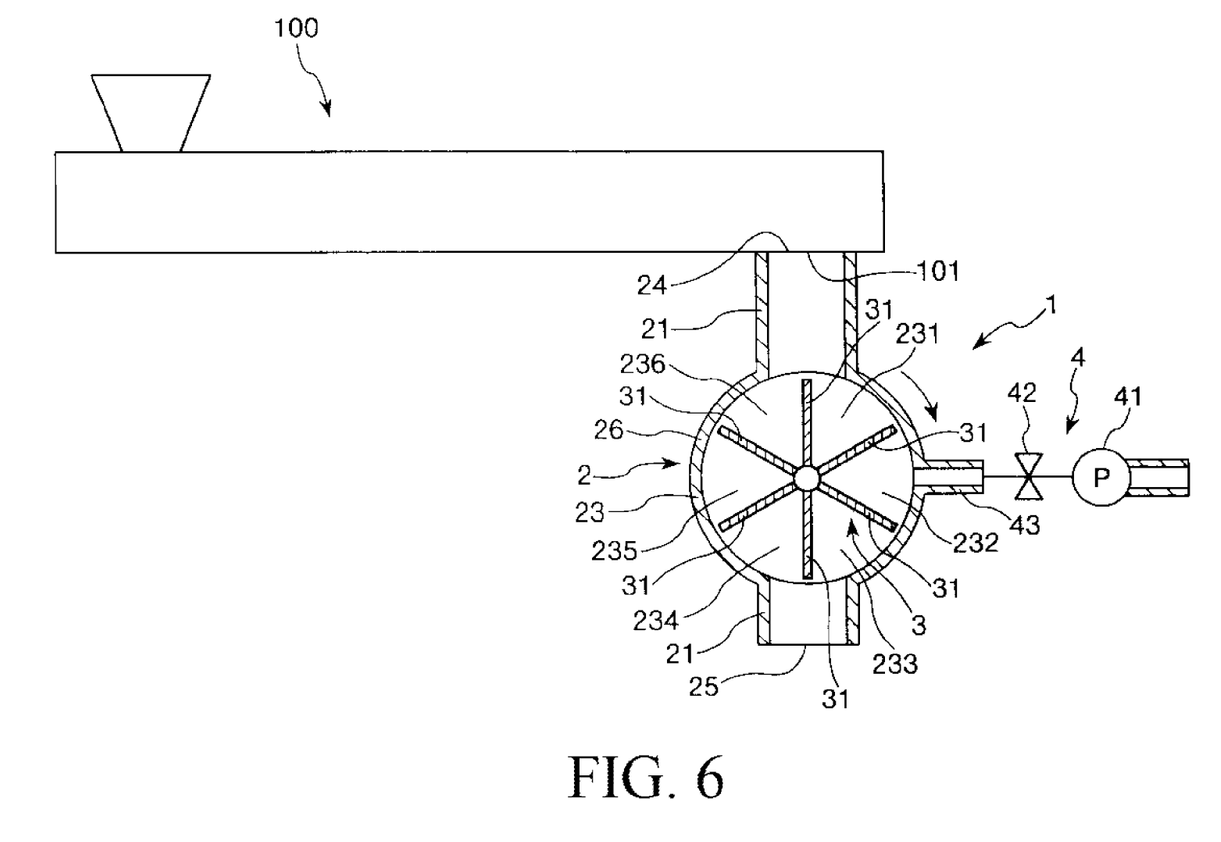
FIG. 6 is a cross section view showing a degassing apparatus according to a third embodiment of the present invention.
Figure 7:
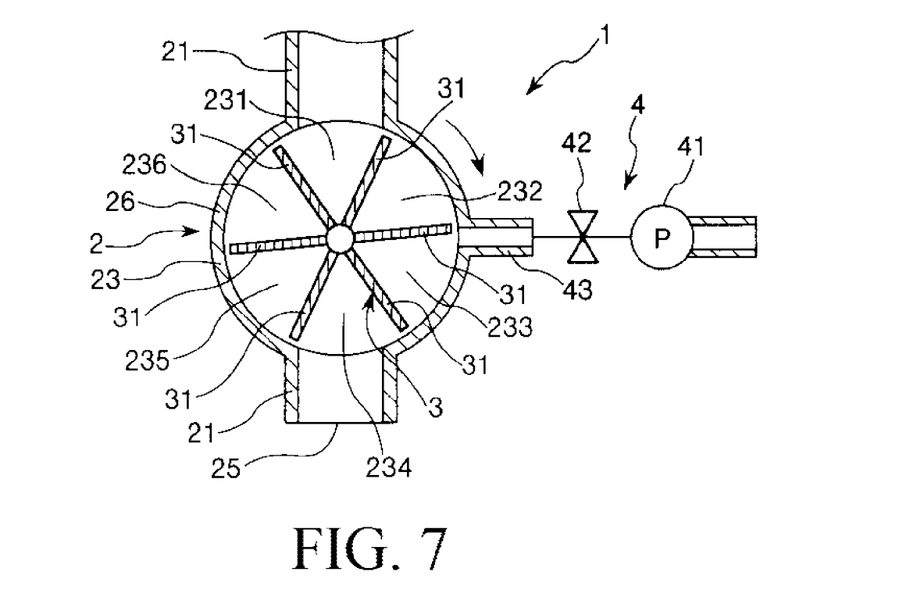
FIG. 7 is a cross section view showing the degassing apparatus shown in FIG. 6.
Figure 8:
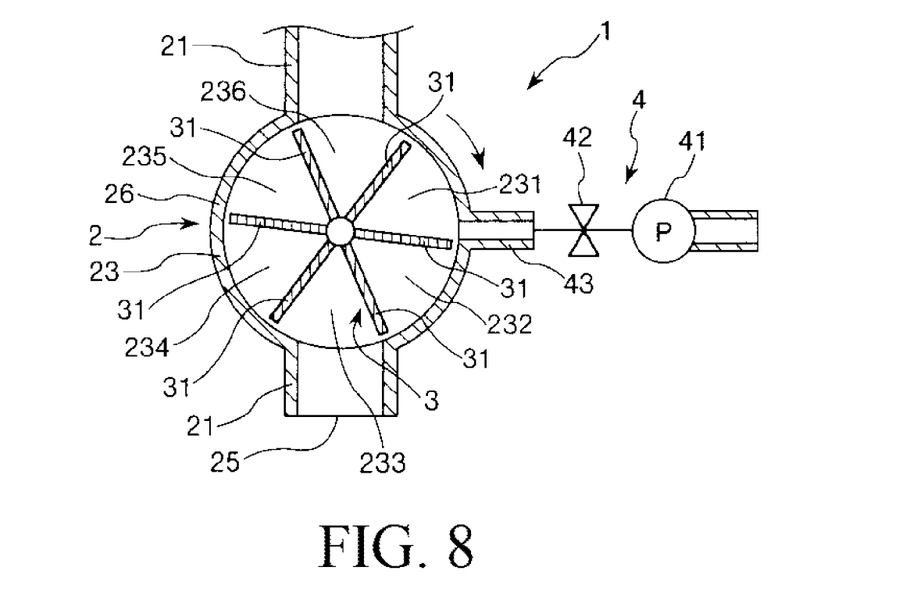
FIG. 8 is a cross section view showing the degassing apparatus shown in FIG. 6.

FIG. 6 is a cross section view showing a degassing apparatus according to a third embodiment of the present invention. Each of FIGS. 7 and 8 is a cross section view showing the degassing apparatus shown in FIG. 6. In the following description, the upper side in FIGS. 6-8 will be referred to as "upper (upstream)", the lower side will be referred to as "lower (downstream)", the left side will be referred to as "left", and the right side will be referred to as "right".

Hereinbelow, the third embodiment of the degassing apparatus will be described by placing emphasis on the points differing from the second embodiment of the degassing apparatus, with the same matters omitted from description.

As shown in FIG. 6, in the degassing apparatus 1 of the third embodiment, the number of the partitioning plates 31 of the rotor 3 is set to be more than that in the degassing apparatus 1 of the second embodiment. Specifically, the rotor 3 has six partitioning plates 31 for partitioning the inside of the cylindrical portion 23 into six spaces 231, 232, 233, 234, 235 and 236. Each of the six spaces 231-236 formed in the cylindrical portion 23 constitutes the space of the degassing chamber 26.

In this configuration, when the space (in the configuration shown in FIG. 3, space 232) communicates with the conduit line 43, the space 232 does not communicate with the inlet port 24 and the outlet port 25. Namely, when the space 232 communicates with the inlet port 24 or the outlet port 25, the space 232 does not communicate with the conduit line 43.

In other words, as shown in FIG. 7, after the space 232 has not communicated with the inlet port 24, the space 232 communicates with the conduit line 43 (in a state that the rotor 3 is slightly rotated compared to the state shown in FIG. 7). Further, as shown in FIG. 8, after the space 232 has not communicated with the conduit line 43, the space 232 communicates with the outlet port 25 (in a state that the rotor 3 is slightly rotated compared to the state shown in FIG. 8). This makes it possible to reliably decompress each of the spaces 231-236. According to the degassing apparatus 1 of the third embodiment, the same effect as the second embodiment described above can be obtained.

Fourth Embodiment

Figure 9:
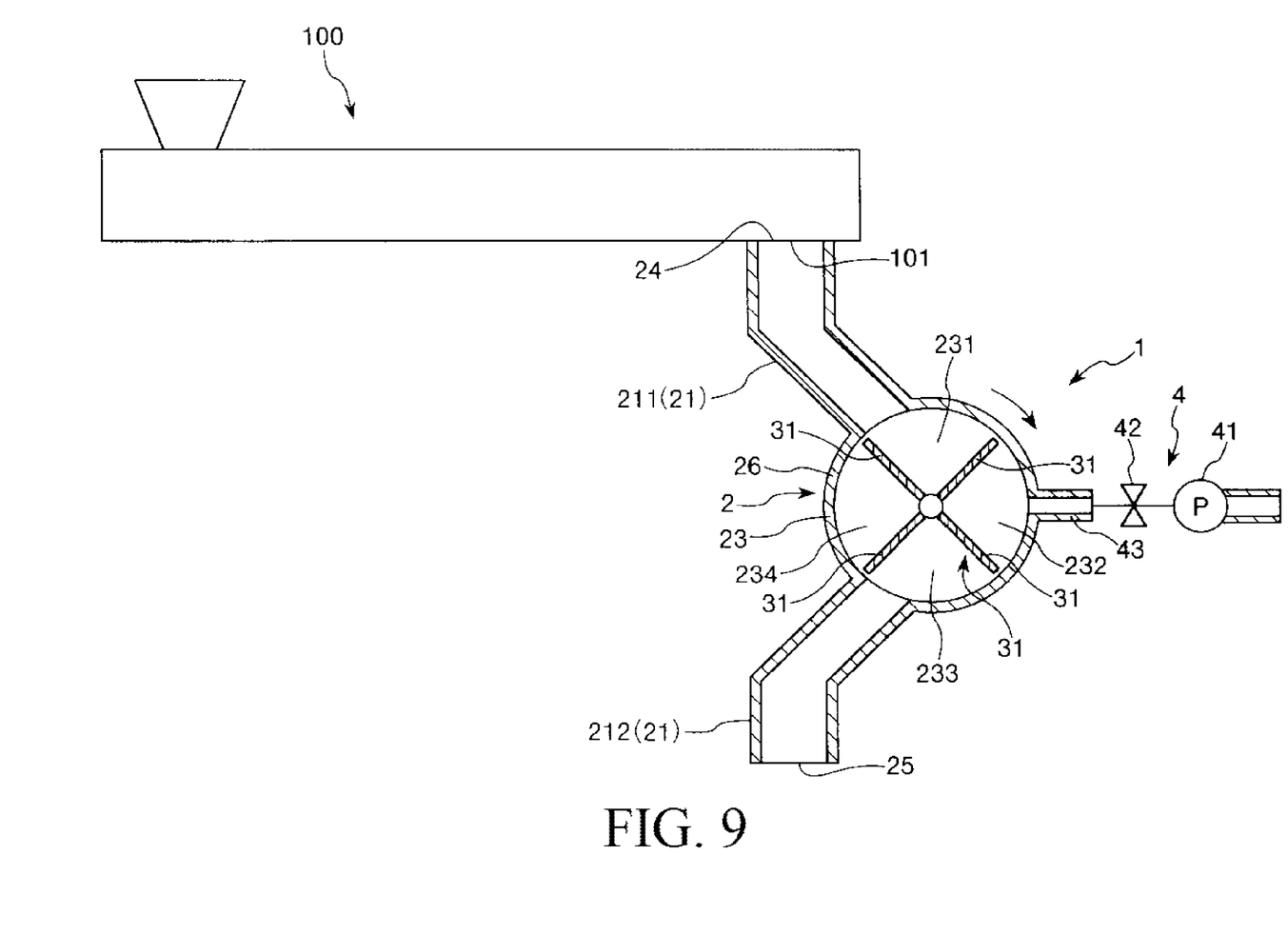
FIG. 9 is a cross section view showing a degassing apparatus according to a fourth embodiment of the present invention.
Figure 10:
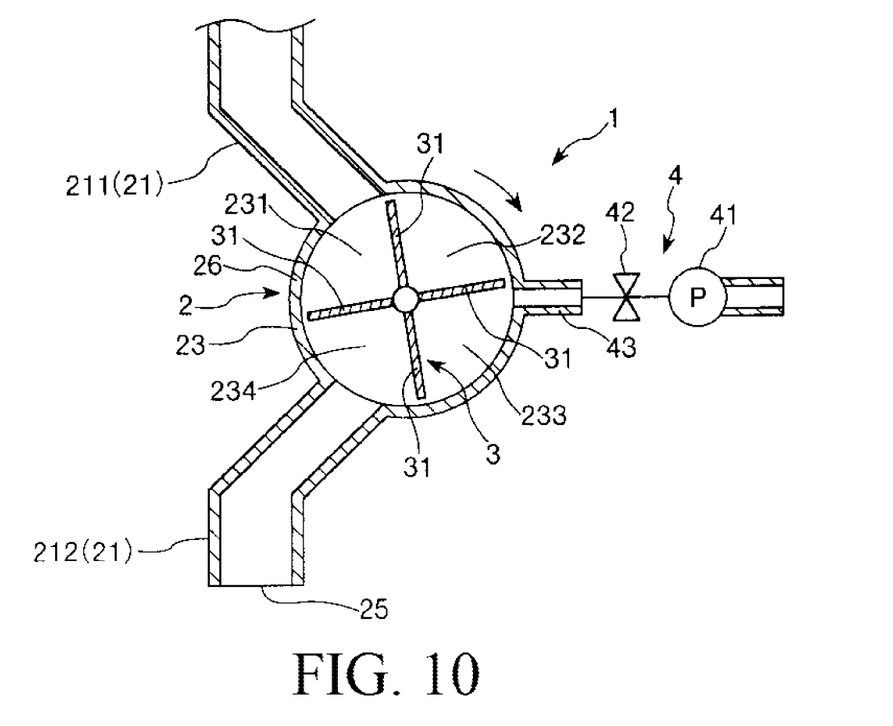
FIG. 10 is a cross section view showing the degassing apparatus shown in FIG. 9.
Figure 11:
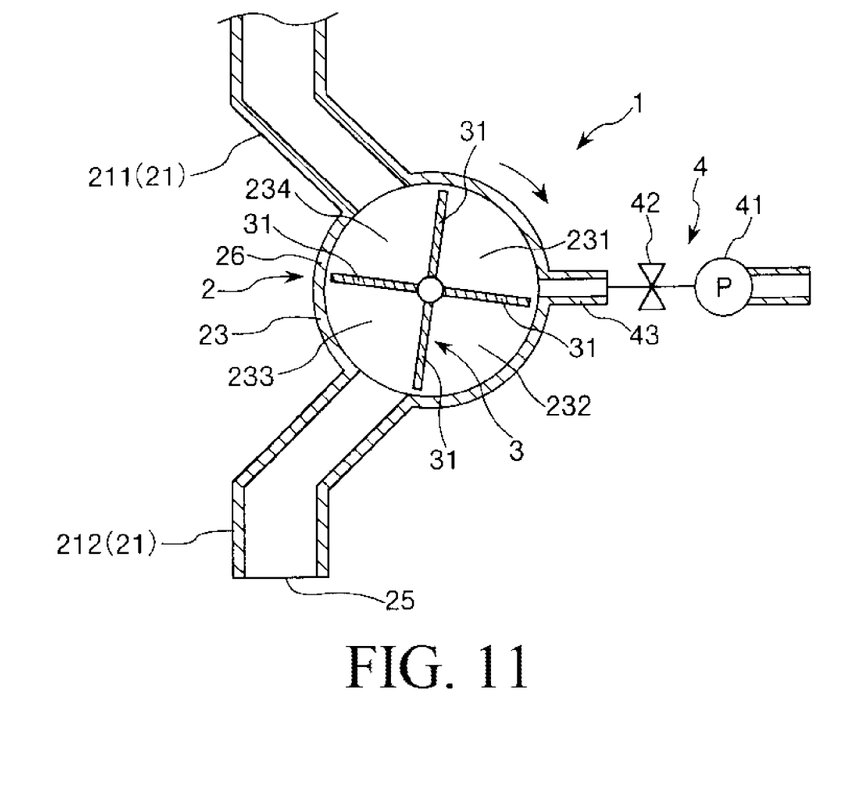
FIG. 11 is a cross section view showing the degassing apparatus shown in FIG. 9.

FIG. 9 is a cross section view showing a degassing apparatus according to a fourth embodiment of the present invention. Each of FIGS. 10 and 11 is a cross section view showing the degassing apparatus shown in FIG. 9. In the following description, the upper side in FIGS. 9-11 will be referred to as "upper (upstream)", the lower side will be referred to as "lower (downstream)", the left side will be referred to as "left", and the right side will be referred to as "right".

Hereinbelow, the Fourth embodiment of the degassing apparatus will be described by placing emphasis on the points differing from the second embodiment of the degassing apparatus, with the same matters omitted from description.

As shown in FIG. 9, in the degassing apparatus 1 of the fourth embodiment, the conduit line 21 is configured to be bent or curved. The conduit line 211 provided in the upper side of the cylindrical portion 23 is connected to (communicated with) the cylindrical portion 23 on a position shifted to the left side with respect to a position just above the cylindrical portion 23. Further, the conduit line 212 provided in the lower side of the cylindrical portion 23 is connected to the cylindrical portion 23 on a position shifted to the left side with respect to a position just below the cylindrical portion 23. In this case, the conduit line 211, the conduit line 211 and the conduit line 43 are arranged at equal (angle) intervals (in the configuration shown in the drawings, 120 degree intervals).

In this configuration, when the space (in the configuration shown in FIG. 9, space 232) communicates with the conduit line 43, the space 232 does not communicate with the inlet port 24 and the outlet port 25. Namely, when the space 232 communicates with the inlet port 24 or the outlet port 25, the space 232 does not communicate with the conduit line 43.

In other words, as shown in FIG. 10, after the space 232 has not communicated with the inlet port 24, the space 232 communicates with the conduit line 43 (in a state that the rotor 3 is slightly rotated compared to the state shown in FIG. 10). Further, as shown in FIG. 11, after the space 232 has not communicated with the conduit line 43, the space 232 communicates with the outlet port 25 (in a state that the rotor 3 is slightly rotated compared to the state shown in FIG. 11). This makes it possible to reliably decompress each of the spaces 231-234. According to the degassing apparatus 1 of the Fourth embodiment, the same effect as the second embodiment described above can be obtained.

While the descriptions are given to the degassing apparatus according to the present invention shown in the drawings, the present invention is not limited thereto. Bach component constituting the degassing apparatus may be substituted for an arbitrary component having the same function as it. Further, arbitrary structures also may be added thereto.

Further, the degassing apparatus of the present invention may be made by combining two or more of the arbitrary structures (features) in one of the embodiments described above.

INDUSTRIAL APPLICABILITY

With the present invention, since the degassing apparatus has the separating device, it is possible to prevent adverse effect from being given on the process of the kneading apparatus and reliably degas the kneaded composition. For the reasons stated above, the present invention is industrially applicable.

What is claimed is:
1. A degassing apparatus being configured so as to be connected to a kneading apparatus that kneads a material and has an outlet port from which the material kneaded by the kneading apparatus is discharged, said degassing apparatus comprising:

a housing having an inlet port that communicates with the outlet port of the kneading apparatus in a connecting state that the degassing apparatus is connected to the kneading apparatus so that the material having been kneaded is introduced therefrom, a degassing chamber in which the kneaded material is degassed and an outlet port that is opened to an outside of the degassing apparatus in the connecting state so that the kneaded material having been degassed is discharged to the outside;

a decompression device that decompresses the degassing chamber; and a separating device that hermetically separates the outlet port of the housing from the degassing chamber, wherein in a state that the outlet port of the housing is hermetically separated from the degassing chamber by the separating device, and then the degassing chamber is decompressed by the decompression device, the material introduced into the degassing chamber is degassed.

2. The degassing apparatus as claimed in claim 1, wherein the housing further has a cylindrical portion which is formed into cylindrical shape and provided between the inlet port and the outlet port, wherein the separating device is rotatably provided in the cylindrical portion and has a rotor having plural partitioning plates which partition an inside of the cylindrical portion into plural spaces, and wherein the material is delivered to the outlet port with the partitioning plates by rotation of the rotor.

3. The degassing apparatus as claimed in claim 2, wherein the degassing chamber is provided between the inlet port and the cylindrical portion.

4. The degassing apparatus as claimed in claim 2, wherein a gap is formed between an inner peripheral surface of the cylindrical portion and a distal end portion of the partition plate and a width of the gap is set to be equal to or less than 0.2 mm.

5. The degassing apparatus as claimed in claim 2, wherein at least a surface of the rotor is constituted of a nonmetallic material.

6. The degassing apparatus as claimed in claim 2, wherein at least an inner peripheral surface of the cylindrical portion is constituted of a nonmetallic material.

7. The degassing apparatus as claimed in claim 1, wherein the degassing apparatus is configured so that a retention time of the material is set to be equal to or less than 1 minute by controlling a driving of the rotor.

8. The degassing apparatus as claimed in claim 1, wherein the degassing apparatus is configured so that the pressure in the degassing chamber is set to be equal to or less than 60 kPa by decompressing the degassing chamber with the decompressing device.

9. The degassing apparatus as claimed in claim 1, wherein the inlet port is connected to a discharge passage of a kneading device in which the material is kneaded.

10. The degassing apparatus as claimed in claim 1, wherein the degassing apparatus is configured so as to use the material including a resin and fine particles.

11. A system of kneading and degassing a material, the system comprising:

a kneading apparatus that kneads the material, the kneading apparatus having an outlet port from which the material kneaded by the kneading apparatus is discharged; and the degassing apparatus of claim 1 which is connected to the kneading apparatus.

12. A degassing apparatus comprising:

a housing having an inlet port from which a material that has been kneaded is introduced, a degassing chamber having a cylindrical portion formed into cylindrical shape, the degassing chamber in which the kneaded material is degassed, and an outlet port from which the kneaded material that has been degassed is discharged;

a decompression device having a conduit line communicated with the degassing chamber, the decompression device that decompresses an inside of the degassing chamber; and a separating device rotatably provided in the cylindrical portion and having a rotor with plural partitioning plates, the plural partitioning plates partitioning an inside of the cylindrical portion into plural spaces, the separating device that hermetically separates the outlet port from the degassing chamber, wherein each of the plural spaces is allowed to be rotated and the material degassed is delivered to the outlet port with the partitioning plates by a rotation of the rotor, wherein in a state that the outlet port is hermetically separated from the degassing chamber by the separating device, and then the inside of the degassing chamber including one space of the plural spaces, which is communicated with the conduit line, is decompressed through the conduit line by the decompression device, the material introduced into the degassing chamber is degassed.

13. The degassing apparatus as claimed in claim 12 having a non-communicating state in which the one space does not communicate with the inlet port and the outlet port, wherein the material in the degassing chamber is degassed in the non-communicating state.

* * * * *